United States Patent [19]
Ohno

[11] 4,455,514
[45] Jun. 19, 1984

[54] CONTROL CIRCUIT FOR A BRUSHLESS DC MOTOR

[75] Inventor: Hirotoshi Ohno, Yokohama, Japan

[73] Assignee: Victor Company of Japan, Limited, Yokohama, Japan

[21] Appl. No.: 370,246

[22] Filed: Apr. 20, 1982

[30] Foreign Application Priority Data

Apr. 21, 1981 [JP] Japan ................................ 56-59951

[51] Int. Cl.³ .......................................... H02K 29/00
[52] U.S. Cl. .................................. 318/254; 318/138; 318/439
[58] Field of Search .................... 318/254 A, 254, 138, 318/439

[56] References Cited

U.S. PATENT DOCUMENTS

| | | | |
|---|---|---|---|
| 3,383,574 | 5/1968 | Manteuffel | 318/254 A |
| 3,783,359 | 1/1974 | Malkiel | 318/254 A |
| 3,938,014 | 2/1976 | Nakajima | 318/254 A |
| 4,344,023 | 8/1982 | Yokobori et al. | 318/254 A |

*Primary Examiner*—David Smith, Jr.
*Attorney, Agent, or Firm*—Lowe, King, Price & Becker

[57] ABSTRACT

Disclosed is a control circuit for a brushless DC motor including a rotor having a series of alternating magnetic fields and a stator having a plurality of armature windings. The control circuit comprises at least one pair of Hall generators fixedly mounted with respect to the rotor for sensing the angular position of the rotor to generate a switching signal. An input torque command signal is applied sequentially to the armature windings in response to the switching signal to rotate the rotor. The strength of magnetic field linked with the windings and the magnitude of current generated therein are detected and multiplied to generate a torque representing signal which is subtractively combined with the input torque command signal prior to application to the windings.

13 Claims, 8 Drawing Figures

CONTROL CIRCUIT FOR A BRUSHLESS DC MOTOR

BACKGROUND OF THE INVENTION

The present invention relates generally to brushless DC motors, and in particular to a control circuit for such motors. The invention is particularly suitable for driving motors used in audio or video systems wherein motor torque must be maintained to close tolerances.

Brushless DC motors and associated control circuits for use in audio and video systems are designed so as to minimize the amount of inherent mechanical vibrations to meet the imposed strict requirements. A typical example of such control circuits comprises at least one pair of Hall generators fixedly mounted with respect to the rotor. Each of the Hall generators is associated with a current control circuit which selectively supplies an input torque command signal to the armature windings in response to a voltage signal developed in the associated Hall generator to cause rotation of the rotor. The circuit includes a feedback path through which the amount of current flowing through the windings is subtractively combined with the input signal.

While the average value of torque is maintained constant due to the feedback operation, the instantaneous torque value varies as the rotor shifts from one armature winding to another. This ripple component is believed to arise from the fact that the feedback operation is only based upon the armature current which is not a true indication of the amount of torque needed to compensate for transient torque variations.

SUMMARY OF THE INVENTION

The present invention is based on the fact that a brushless DC motor is basically a current-to-torque converter wherein the torque derived by each armature winding is represented by the product of the current flowing through that winding and the magnetic field which links with that winding so that the motor torque is the sum of the torques derived by the windings.

To eliminate the disadvantages inherent in the prior art approach the present invention comtemplates detecting the current in an armature winding of a brushless DC motor and the strength of a magnetic field linked with the armature winding and multiplying the detected quantities to provide a torque representing feedback signal. The feedback signal is subtractively combined with an input torque command signal and applied selectively to the armature windings of the brushless DC motor to cause rotation of the motor. The brushless DC motor driven by the control circuit of the invention has a linear transfer function with which the input torque command signal is converted to output torque.

According to a broader aspect of the invention, a method is provided for operating a brushless DC motor including a rotor having a series of alternating magnetic fields and a stator having a plurality of armature windings. The method comprises the steps of sequentially applying an input signal to the armature windings when the rotor is in a predetermined position with respect to the stator, detecting the strength of the magnetic field linked with the armature windings and the magnitude of current generated therein, multiplying the detected field strength and current magnitude to generate a torque representing signal, and subtractively combining the torque representing signal with the input signal prior to application to the windings.

According to a specific aspect of the invention, a control circuit is provided for a brushless DC motor including a rotor having a series of alternating magnetic fields on the circumference thereof and a stator having a plurality of armature windings. The control circuit comprises magnetic field sensing and current switching means fixedly with respect to the rotor for sensing a predetermined position of the rotor with respect to the stator and generating therefrom a switching signal. Current generating means sequentially applies an input signal to the windings in response to the switching signal to generate a current therein. The control circuit further comprises multiplying means for sensing the strength of the magnetic field linked with the windings and the magnitude of current in the windings. The multiplying means generates an output signal representative of the product of the sensed field strength and current magnitude. The output signal is subtractively combined with the the input signal prior to application to the armature windings.

BRIEF DESCRIPTION OF THE DRAWINGS

The present invention is described in further detail with reference to the accompanying drawings, in which.

DETAILED DESCRIPTION

Figure 1:
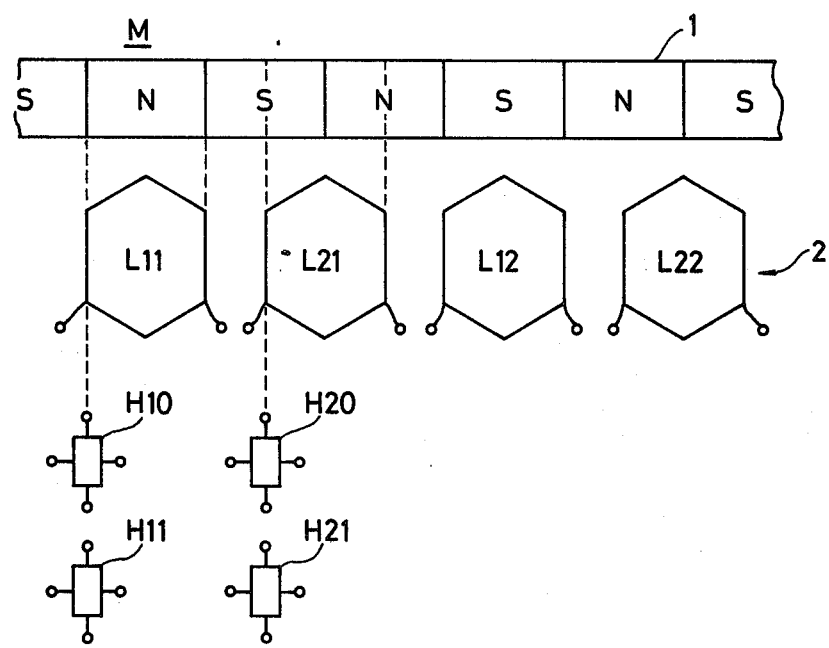
FIG. 1 is a schematic illustration of a brushless DC motor in developed form.
Figure 2:
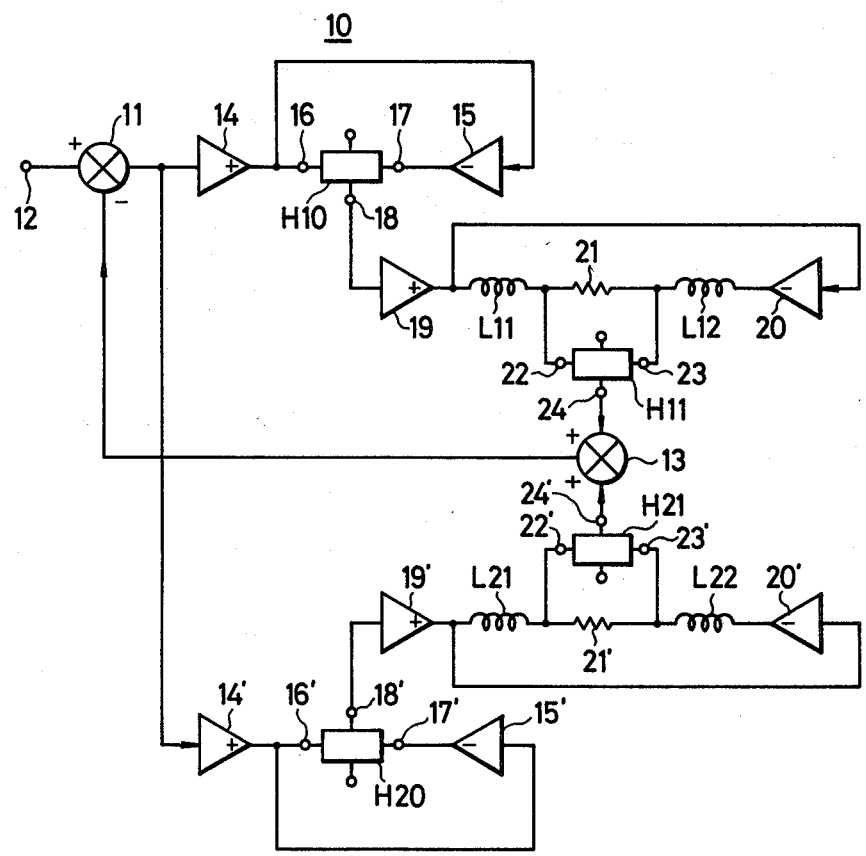
FIG. 2 is a block diagram of a control circuit according to one embodiment of the invention for controlling the motor of FIG. 1.

Referring now to FIGS. 1 and 2, there is shown a first preferred embodiment of the present invention. Illustrated at 1 in FIG. 1 is a rotor of a two-phase brushless DC motor M shown in developed form. On the circumference of motor M are plural alternating magnetic poles N and S; the angular spacing between adjacent N and S pole pieces corresponds to an electrical angle of 180 degrees. A stator 2 comprises a first pair of armature windings L11 and L12 and a second pair of armature windings L21 and L22. The armature windings of each pair are interleaved with those of the other pair and electrically spaced apart by 540° so that each winding is positioned to link with magnetic fields of opposite polarity with respect to the other winding of the same pair, but electrically spaced by 270° from adjacent windings of the other pair. For purposes of selectively supplying currents to the armature windings of the first and second pairs, there is provided a pair of Hall generators H10 and H20 which are spaced apart by the same electrical angle as the angle between the armature windings L11 and L21. Generators H10 and H20 detect the angular position of the rotor 1 with respect to the armature windings of each pair. Hall generators may be located below the windings L12 and L22.

According to the invention, torque detecting Hall generators H11 and H21 are mounted in positions aligned with the current switching Hall generators H10 and H20, respectively. As described hereinbelow, the torque detecting Hall generators detect currents flowing through the armature windings L11, L12, L21 and L22 and at the same time the strength of magnetic field linked with one of the armature windings of each pair.

Referring to FIG. 2, a control circuit 10 for the brushless DC motor is illustrated. The control circuit comprises an adder 11 having a positive input terminal responsive to an external source of a torque control voltage at input terminal 12 and a negative input terminal responsive to a negative feedback control signal derived from a second adder 13. A BTL (balanced transformerless) amplifier unit includes a pair of first and second amplifiers 14 and 15 each of which generates and output of opposite polarity. The output of the adder 11 is coupled to the amplifier 14 and thence to the amplifier 15 to generate a pair of torque error voltages of opposite polarity. The error voltages are fed to the current input terminals 16 and 17 of the current switching Hall generator H10. A voltage output terminal 18 of the Hall generator H10 is coupled to the input of an amplifier 19 and thence to an amplifier 20. Thus, amplifiers 19 and 20, which form a BTL amplifier unit, generate voltages of opposite polarity which are proportional in magnitude to the magnetic field strength at the location of armature windings L11 and L12 and to the error voltage from the adder 11.

Between the outputs of amplifiers 19 and 20 is connected a series circuit including the armature windings L11 and L12 and a current detecting resistor 21. The voltage developed across the resistor 21, thus representative of the current flowing through the windings L11 and L12, is applied to current input terminals 22 and 23 of the Hall generator H11. The voltage developed at a voltage output terminal 24 of the Hall generator H11 is proportional to the product of the magnetic field strength B at the location of the windings L11 and L12 and the armature current I flowing through these windings. The multiplied quantities B and I are applied to one input of the adder 13 which also receives other multiplied quantities B' and I' developed in a similar circuit arrangement provided for the Hall generators H20 and H21. This circuit arrangement comprises elements designated by primed numerals corresponding to those in the circuit provided for the Hall generators H10 and H11. Specifically, the current switching Hall generator H20 has its current inputs 16' and 17' coupled to the outputs of amplifiers 14' and 15' which are in turn coupled from the output of adder 11, the voltage developed at a voltage output terminal 18' being proportional to the field strength at the location of armature windings L21 and L22 and to the torque error voltage from the adder 11. Armature windings L21 and L22 are series connected with a current detecting resistor 21' between the outputs of amplifiers 19' and 20' which are coupled from the voltage output terminal 18' of Hall generator H20.

The Hall generator H21 have its current input terminals 22' and 23' coupled across the current detecting resistor 21' to generate a voltage output which is proportional to the product of the magnetic field strength B' at the location of armature windings L21 and L22 and the current I' flowing through these windings.

The multiplied quantities B×I and B'×I' are summed in the adder 13 and supplied to the negative input of the adder 11. In this way, the armature windings of the first and second pairs are both energized by currents proportional to the compensated torque control voltage so that the transfer function of the brushless DC motor M between its input and output is rendered linear.

Figure 3:
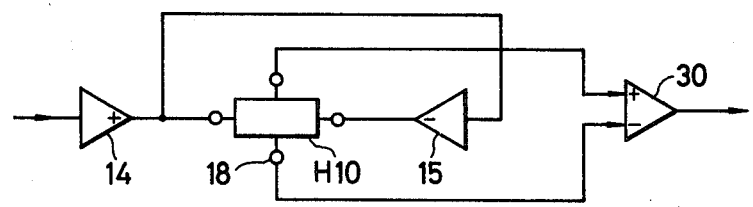
FIG. 3 is of a block diagram of a part of a modification of FIG. 2.

The circuit 10 may be modified as to the details. For example, the BTL amplifiers are alternatively replaced with unity gain operational amplifier inverters. Furthermore, the voltage output terminals of each Hall generator could be utilized by coupling respectively to the positive and negative inputs of a differential amplifier 30 as typically shown in FIG. 3. The use of differential amplifiers 30 for the Hall generators H10, H20, H11 and H21 is preferred due to the noise cancelling effect of the amplifiers 30.

Figure 4:
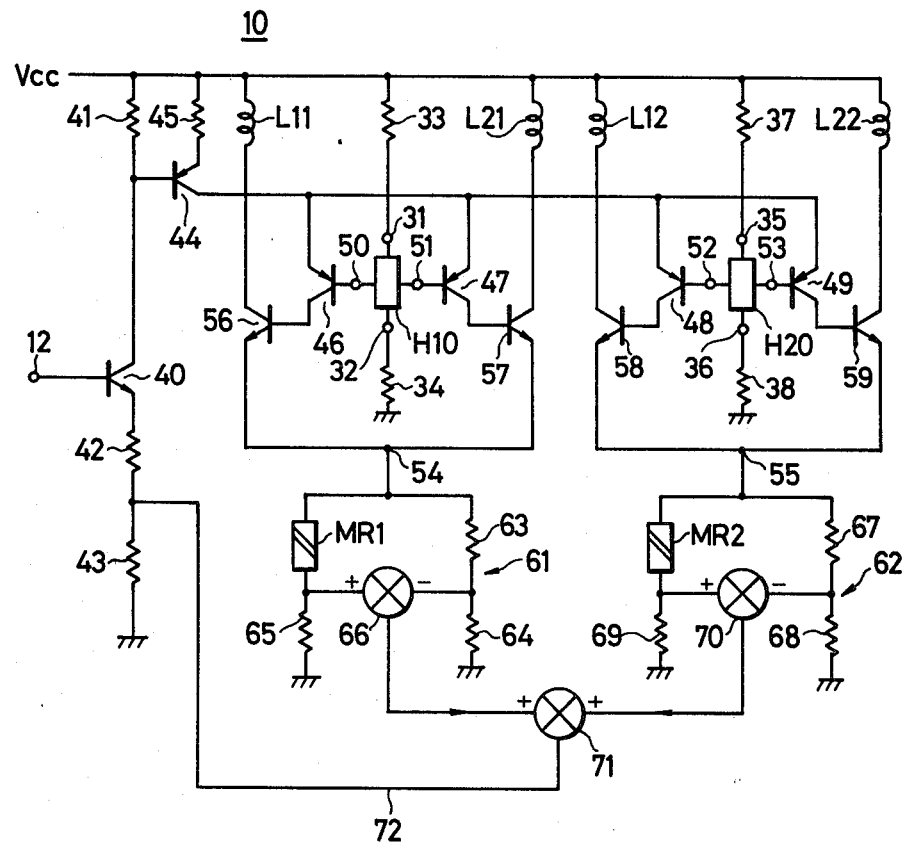
FIG. 4 is a block diagram of a control circuit of a modified embodiment of the invention.
Figure 5:
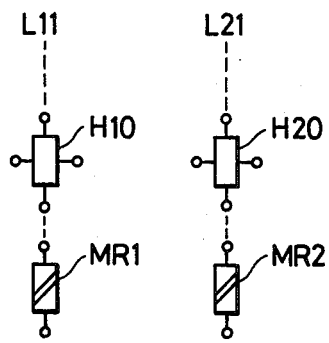
FIG. 5 is a schematic illustration of the arrangement of magnetoresistance elements with respect to Hall generators, the arrangement being associated with the control circuit of FIG. 4.

FIG. 4 is an illustration of a second embodiment of the control circuit. In this embodiment magnetoresistive elements MR1 and MR2 are used in place of the torque detecting Hall generators H11 and H21 of the previous embodiment. Hall generator H10 has a current input terminal 31 coupled by resistor 33 to a voltage supply Vcc and another current terminal 32 coupled to ground by a resistor 34. In like manner, Hall generator H20 has a current terminal 35 coupled to the voltage supply by a resistor 37 and another input 36 coupled to ground by a resistor 38. The torque control voltage at terminal 12 is applied to the base of a transistor 40 having its collector-emitter path connected in a series circuit including resistors 41, 42 and 43 between voltage supply Vcc and ground. To the junction between resistor 41 and the collector of transistor 40 is connected the base of a transistor 44, having an emitter coupled by a resistor 45 to the voltage supply and a collector coupled to the emitters of p-n-p transistors 46, 47, 48 and 49. The bases of transistors 46 and 47 are coupled to the voltage output terminals 50 and 51 of the current Hall generator H10. Similarly, the bases of transistors 48 and 49 are coupled to the voltage output terminals 52 and 53 of the Hall generator H20. The p-n-p transistors 46, 47, 48 and 49 have collectors connected to the bases of power-rated n-p-n transistors 56, 57, 58 and 59, respectively. Armature windings L11 and L12 are connected from the voltage supply Vcc to the collectors of power transistors 56 and 57 which in turn have emitters coupled together to a node 54. Similarly, armature windings L21 and L22 are connected from the voltage supply to the collectors of power transistors 58 and 59 having emitters coupled together to a node 55.

The magnetoresistive elements MR1 and MR2 are respectively included in bridge resistance networks 61 and 62 which are connected to the nodes 54 and 55, respectively. The bridge network 61 is formed by resistors 63 and 64 connected in series between the node 54 and ground and a resistor 65 which is coupled in series with the magnetoresistance element MR1 between the node 54 and ground, with the junction between resistors 63 and 64 and the junction between element MR1 and resistor 65 being respectively coupled to the negative and positive inputs of an adder 66. In like manner, the bridge network 62 is formed by resistors 67 and 68 connected in series between the node 55 and ground and a resistor 69 which is coupled in series with the magnetoresistance element MR2 between the node 55 and ground; the junction between resistors 67 and 68 and the junction between element MR2 and resistor 69 being respectively coupled to the negative and positive inputs of an adder 70. The bridge circuit arrangement is particularly advantageous in that temperature responsive resistance variations are automatically cancelled in the adder. The outputs of the adders 66 and 70 are summed in an adder 71 having an output coupled to the junction between resistors 42 and 43 through a feedback path 72.

In operation, the collector current of transistor 40 and hence the potential at the base of transistor 44, is controlled in response to the torque control voltage at terminal 12 and further in response to the potential applied to the junction between resistors 42 and 43 by feedback path 72. The latter potential counteracts the torque control input so that transistor 40 acts in the same way as adder 11 of the FIG. 1 embodiment to generate the error voltage.

Hall generators H10 and H20 are respectively supplied with constant DC currents to generate voltages of constant magnitude in response to the rotor 1 moving past them. The voltages derived from generators H10 and H20 are coupled to the bases of transistors 46 through 49 which are fed with a torque error current commonly supplied from the collector of transistor 44. Thus, in the presence of a Hall voltage in each Hall generator the potentials at the bases of power transistors 56, 57, 58 and 59 are responsive to the torque error voltage at the collector of transistor 40. Since the magnetoresistance element has a variable resistance value as a function of field intensity, and since the armature currents are drained through the magnetoresistance elements MR1 and MR2, the output of each of the adders 66 and 70 varies as a function of the product of the armature currents and the field intensities. Thus, the summed output of the adder 71 represents the amount of torque by which the torque command input at terminal 12 is compensated.

Figure 6:
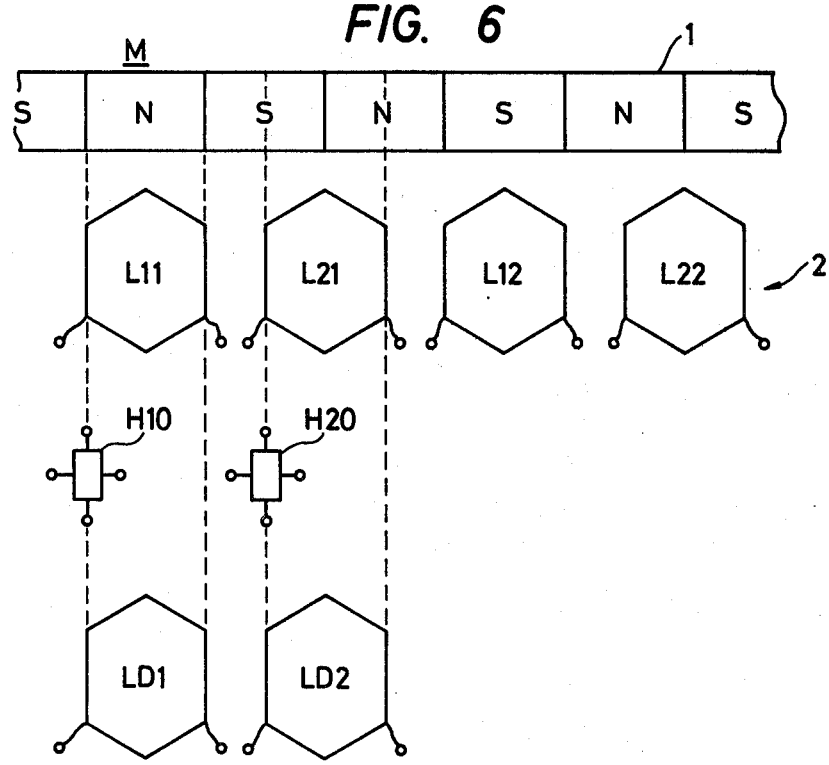
FIG. 6 is a schematic illustration of a brushless DC motor having detector coils instead of the Hall generators used in the motor of FIG. 1.

FIG. 6 is an illustration of a third embodiment of the invention which differs from the embodiment of FIG. 1 in that the torque detecting Hall generators H11 and H21 are replaced with detector windings LD1 and LD2 which are mounted on the same stator core as the armature windings L11 and L21.

Figure 7:
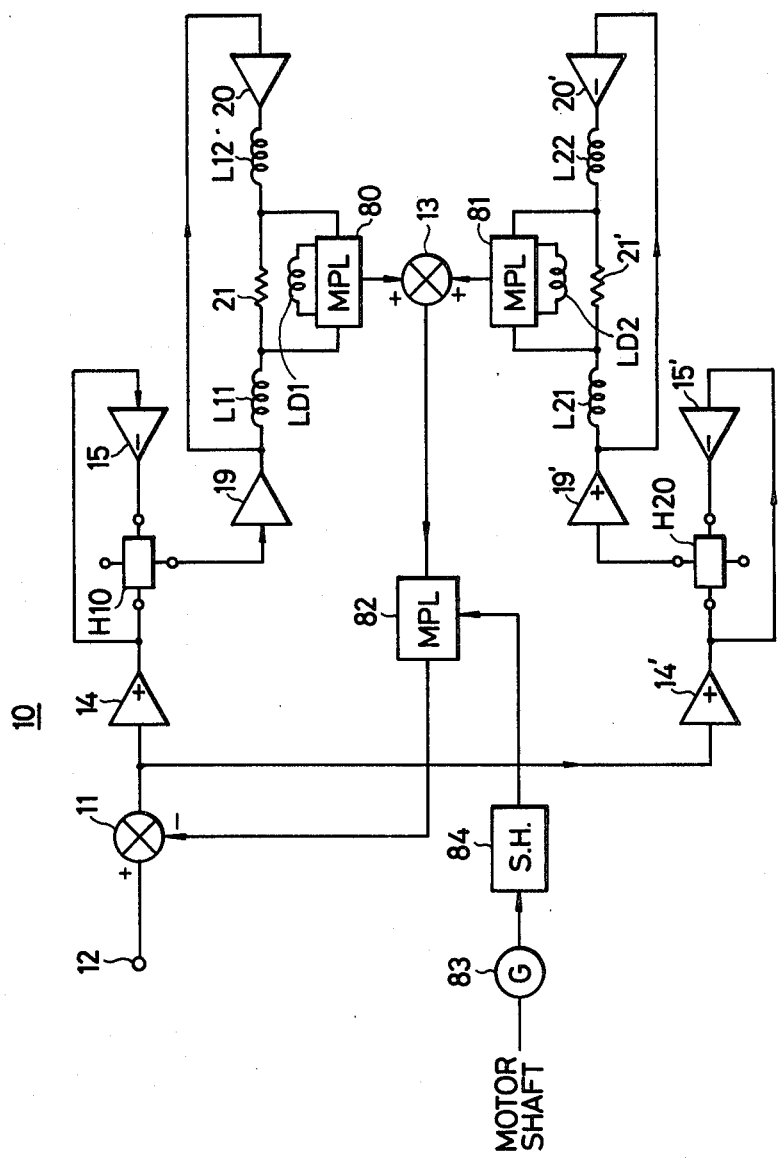
FIG. 7 is a block diagram of a control circuit associated with the motor of FIG. 6.

The control circuit 10 for the brushless DC motor of FIG. 6 is shown in FIG. 7 which is generally similar to the control circuit of FIG. 2. In FIG. 7 the same numerals are used to indicate parts corresponding in significance to those in FIG. 2. The detector winding LD1 is connected to a multiplier circuit 80 (multiplier type MC-1494 available from Motorola) which is also coupled across the current detecting resistor 21. Similarly, the detector winding LD2 is coupled to a multiplier circuit 81 which having inputs responsive to the voltages at opposite terminals of current detecting resistor 21'. The output of each of the multipliers 80 and 81 represents the product of armature current and field intensity.

However, since the voltage developed in each detector winding is variable as a function of the rotational speed of the rotor 1 and to magnetic field strength, it is necessary to cancel such speed components contained in the output of the adder 13. For this purpose, the output of adder 13 is coupled to a multiplier 82 having another input responsive to a signal indicative of the motor shaft speed. To detect motor shaft speed, the motor shaft drives generator 83, having an output coupled to sample-and-hold circuit 84. The generator 83 is of a conventional design which generates a varying number of constant duration pulses as a function of the rotor speed. The sample-and-hold circuit 84 integrates the pulse signals into a voltage signal. Since the interval between such constant duration pulses is inversely proportional to the rotor speed, the voltage derived from the sample-and-hold circuit is the reciprocal of the rotor speed. The multiplier 82 multiplies the output of adder 13 by the reciprocal value to cancel the speed factor, providing a torque indicating voltage to the negative input of adder 11.

Figure 8:
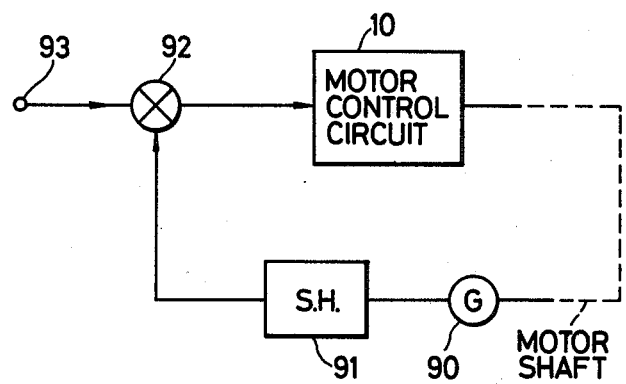
FIG. 8 is a block diagram of a control circuit useful for controlling the speed of the DC motor at a constant value.

The linear transfer function of the motor torque control according to the invention could be advantageously utilized to control the motor speed at a constant value. One example of such constant speed control is shown in FIG. 8 in which the rotor shaft of the motor is coupled to a generator 90 to generate a train of speed related constant duration pulses. A sample-and-hold circuit 91 converts the pulses into a speed related voltage signal which is applied to the negative input of an adder 92 as a negative feedback signal. A speed command signal, applied to an input terminal 93, is fed to the positive input of the adder 92. The combined output of the adder 92 is then applied to the input terminal 13 of the motor control circuit 10. Due to the linear transfer function of the control circuit 10, the motor speed is maintained constant without fluctuations in torque.

What is claimed is:

1. A method of operating a brushless DC motor in response to a control signal, the motor including a rotor having a series of magnetic poles arranged to have alternating magnetic fields of opposite polarities and a stator having a plurality of armature windings, comprising the steps of:

sequentially generating in said windings a current variable as a function of said control signal and as a function of the angular position of the rotor with respect to each of said windings;

detecting the strength of a magnetic field linked with each of the armature windings and the magnitude of the current generated in each of the windings;

multiplying the detected field strength of each winding by the detected current magnitude of each winding to generate a torque representing a compensation signal for each of said windings; and correcting said control signal with said compensation signal.

2. A control circuit for controlling a brushless DC motor in response to a torque control signal, said motor including a rotor having a series of magnetic poles arranged to have alternating magnetic fields of opposite polarities and a stator having first and second armature windings, comprising:

first and second magnetic field sensing means respectively positioned in flux-sensing relationship with said windings and arranged to be responsive to said torque control signal to generate first and second output signals respectively, each of said first and second signals being variable as a function of said control signal and as a function of the angular position of the rotor with respect to the windings;

first and second current generating means for respectively generating in said windings first and second currents respectively proportional to said first and second output signals;

first and second torque sensing means respectively positioned in flux-sensing relationship to said windings for (a) sensing the strength of magnetic field linked with each of said windings, (b) sensing the magnitude of the currents flowing respectively in said windings, and (c) multiplying the sensed magnetic field strength by the sensed current magnitude to generate first and second compensation signals successively; and means for correcting said control signal with said first and second compensation signals, whereby a feedback loop is formed for each of said windings to control the torque of the motor at a constant value corresponding to said control signal.

3. A control circuit as claimed in claim 2 wherein said first and second torque sensing means comprise:

first and second current sensing means respectively connected in series with the armature windings for generating a voltage proportional to the current generated in each of said windings; and first and second Hall generators respectively positioned in flux-sensing relationship with said windings, said Hall generators each having a pair of current input terminals and a pair of voltage output terminals, the current input terminals of said first and second Hall generators being coupled respectively to the first and second current sensing means for generating said compensation signal at the voltage output terminals of each said Hall generator.

4. A control circuit as claimed in claim 2 wherein said first and second torque sensing means comprise first and second magnetoresistance elements respectively positioned in flux-sensing relationship with said windings and respectively electrically coupled in series to said first and second windings to generate said first and second compensation signals, respectively.

5. A control circuit as claimed in claim 4 wherein said first and second torque sensing means further comprise a first and a second bridge networks, each comprising a first circuit including a series combination of first and second resistors, a second circuit including a series combination of one of said magnetoresistance elements and a third resistor, and means for subtractively combining a voltage developed at the junction between the first and second resistors with a voltage developed at a junction between the magnetoresistance element and the third resistor to generate said compensation signal, the first and second circuits being coupled through a circuit node to a respective one of said windings.

6. A control circuit as claimed in claim 2 wherein said first and second torque sensing means comprise first and second current sensing means respectively connected in series with said windings for generating a voltage proportional to the current generated therein, first and second magnetic field sensing coils respectively positioned in flux-sensing relationship to said windings and first and second multiplier circuits for multiplying the magnitude of the currents detected by the first and second current sensing means by the magnitude of voltages respectively generated in said coils for respectively generating said first and second compensation signals in said multiplier circuits.

7. A control circuit as claimed in claim 3 or 6 wherein said current sensing means comprises a resistance element.

8. A control circuit as claimed in claim 2 wherein said first and second magnetic field sensing means comprise:

first and second Hall generators each having a pair of current input terminals and a pair of voltage output terminals, said first and second Hall generators being respectively positioned in flux-sensing relationship to said first and second windings;

a first circuit for supplying said torque control signal to the current input terminals of the first Hall generator to generate a first voltage across the voltage output terminals thereof; and a second circuit for supplying said torque control signal to the current input terminals of the second Hall generator to generate a second voltage across the voltage output terminals thereof, wherein said first and second current generating means comprise:

a third circuit for generating in said first armature winding a first current proportional to said first voltage; and a fourth circuit for generating in said second armature winding a second current proportional to said second voltage, wherein said first and second torque sensing means are respectively coupled to the third and fourth circuits, and wherein said correcting means comprises an adder for combining the first and second compensation signals and a subtractor for combining the output of said adder with said control signal.

9. A control circuit as claimed in claim 8 wherein the first circuit comprises a first unity gain inverting amplifier coupled from the output of said subtractor to one of the current input terminals of the first Hall generator, having other current input terminal coupled to the output of said subtractor, and the second circuit comprises a second unity gain inverting amplifier coupled from the output of said subtractor to one current input terminal of the second Hall generator having another current input terminal responsive to the output of said subtractor.

10. A control circuit as claimed in claim 8 wherein the first circuit comprises:

a balanced transformerless amplifier unit having first and second amplifiers, the first amplifier having an input coupled to respond to the output of said subtractor and the second amplifier having an input coupled to respond to the output of the first amplifier, current input terminals of the first Hall generator being coupled between the outputs of the first and second amplifiers, and wherein the second circuit comprises:

a balanced transformerless amplifier unit having third and fourth amplifiers, the third amplifier having an input coupled to the output of said subtractor and the fourth amplifier having an input coupled to the output of the third amplifier, current input terminals of the second Hall generator being coupled between outputs of the third and fourth amplifiers.

11. A control circuit as claimed in claim 8 or 10, wherein the third circuit comprises:

a first balanced transformerless amplifier unit having a first, noninverting amplifier coupled to a voltage output terminal of the first Hall generator and a second, inverting amplifier coupled to the output of the first, noninverting amplifier;

a series circuit coupled between the outputs of the first and second amplifiers of the first balanced transformerless amplifier unit and including the first armature winding and a first current sensing element connected to supply a signal to said first torque sensing means; and wherein the fourth circuit comprises:

a second balanced transformerless amplifier unit having a third, noninverting amplifier coupled to a voltage output terminal of the second Hall generator and a fourth, inverting amplifier coupled to the output of the third, noninverting amplifier; and a series circuit coupled between the outputs of the third and fourth amplifiers of the second balanced transformerless amplifier unit and including the second armature winding and a second current sensing element connected to supply a signal to said second torque sensing means.

12. A control circuit as claimed in claim 8 wherein the first and second Hall generators respectively have current input terminals coupled between first and second terminals of a DC voltage source, and said subtractor comprises a common transistor having a base coupled to be responsive to said control signal and a conductive path coupled between said first and second terminals of the voltage source through a resistor responsive to the output of said adder, said first circuit comprising:

first and second transistors of a first conductivity type having conductive paths respectively coupled in series with the first armature winding between the first terminal of said voltage source and a first circuit node; and third and fourth transistors of a conductivity type opposite to the first conductivity type having bases coupled to respond to the voltage output terminals of the first Hall generator and having conductive paths coupled from said subtractor to the respective bases of the first and second transistors; and wherein said second circuit comprises:

fifth and sixth transistors of a particular conductivity type having conductive paths respectively coupled in series with the second armature winding between the first terminal of said voltage source and a second circuit node; and seventh and eighth transistors of the conductivity type opposite to the conductivity type of the fifth and sixth transistors, the seventh and eighth transistors having bases coupled to the voltage output terminals of the second Hall generator and having conductive paths coupled from said common transistor to the respective bases of the first and second transistors;

said first and second torque sensing means respectively comprising first and second magnetoresistive elements coupled respectively from the first and second circuit nodes to the second terminal of the voltage source through respective resistors, the first and second magnetoresistive elements being coupled to inputs of said adder.

13. A control circuit as claimed in claim 12 wherein said first torque sensing means includes a bridge network comprising a first series circuit including a series combination of first and second resistors, a second series circuit including a series combination of the first magnetoresistive element and a third resistor, and means for subtractively combining a voltage developed at the junction between the first and second resistors with a voltage developed at the junction between the first magnetoresistive element and the third resistor to generate said first compensation signal, said first and second series circuits being coupled in parallel between the first circuit node and the second terminal of the voltage source; and wherein said second torque sensing means includes a bridge network comprising a third series circuit including a series combination of first and second resistors, a fourth series circuit including a series combination of the second magnetoresistive element and a third resistor, and means for subtractively combining a voltage developed at the junction between the first and second resistors of the third series circuit with a voltage developed at the junction between the second magnetoresistive element and the third resistor of the fourth series circuit to generate said second compensation signal, said third and fourth series circuits being coupled in parallel between the second circuit node and the second terminal of the voltage source.

* * * * *